United States Patent
McEuen et al.

(10) Patent No.: US 6,837,058 B1
(45) Date of Patent: Jan. 4, 2005

(54) TABLET AIR COOLING DOCK

(75) Inventors: Shawn S. McEuen, Portland, OR (US); Brian Wilk, Portland, OR (US); Himanshu Pokharna, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 10/611,203

(22) Filed: Jun. 30, 2003

(51) Int. Cl.[7] .......................... F25B 21/02; F25D 23/12; H05K 5/00
(52) U.S. Cl. .......................... 62/3.2; 62/259.2; 361/687
(58) Field of Search .......................... 62/3.2, 3.3, 3.6, 62/3.7, 259.2; 165/104.33; 361/676, 688, 689, 687, 697, 699

(56) References Cited

U.S. PATENT DOCUMENTS 5,381,043 A * 1/1995 Kohiyama et al. .......... 307/116
5,704,212 A * 1/1998 Erler et al. .................. 62/3.2

* cited by examiner

*Primary Examiner*—Chen Wen Jiang
(74) *Attorney, Agent, or Firm*—Blakely, Sokoloff, Taylor & Zafman LLP

(57) ABSTRACT

A tablet air cooling dock. In one embodiment, the dock includes a cooling unit a tablet cradle to receive and support a tablet computer. The cradle includes a passageway to receive air from the cooling unit and to provide the air to a vent of the tablet computer. In one embodiment, the tablet cradle is pivotally mounted to provide multiple viewing positions of the tablet computer.

10 Claims, 2 Drawing Sheets

TABLET AIR COOLING DOCK

BACKGROUND

Intel® SpeedStep™ Technology makes it possible for the processor in a docked portable computer to run at a higher frequency than when in undocked battery mode. A faster processor generates more heat and typically requires more cooling. Current practice is to design internal portable computer cooling based on maximum performance heat dissipation requirements. However, market studies indicate portable computers are infrequently used in the high performance mode. As a result, the cooling solution—fans, heat sinks, etc.—are typically larger, heavier, and more expensive than warranted by typical usage models.

Based on the current design paradigm, the continued escalation of system performance and power—aimed at high performance usage scenarios—will require larger onboard cooling solutions occupying a higher percentage of a finite portable computer volume.

Therefore, there is a need to relieve portable computers of at least part of the cooling solutions, or to provide additional cooling capacity when docked.

DETAILED DESCRIPTION

A tablet air cooling dock is described. In one embodiment, the dock includes a cooling unit and a tablet cradle to receive and support a tablet computer. The cradle includes a passageway to receive air from the cooling unit and to provide the air to a vent of the tablet computer. In one embodiment, the tablet cradle is pivotally mounted to provide multiple viewing positions of the tablet computer.

In the following description, numerous specific details are set forth. However, it is understood that embodiments may be practiced without these specific details. In other instances, well-known circuits, structures and techniques have not been shown in detail in order not to obscure the understanding of this description.

Reference throughout this specification to "one embodiment" or "an embodiment" indicate that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Figure 1A:
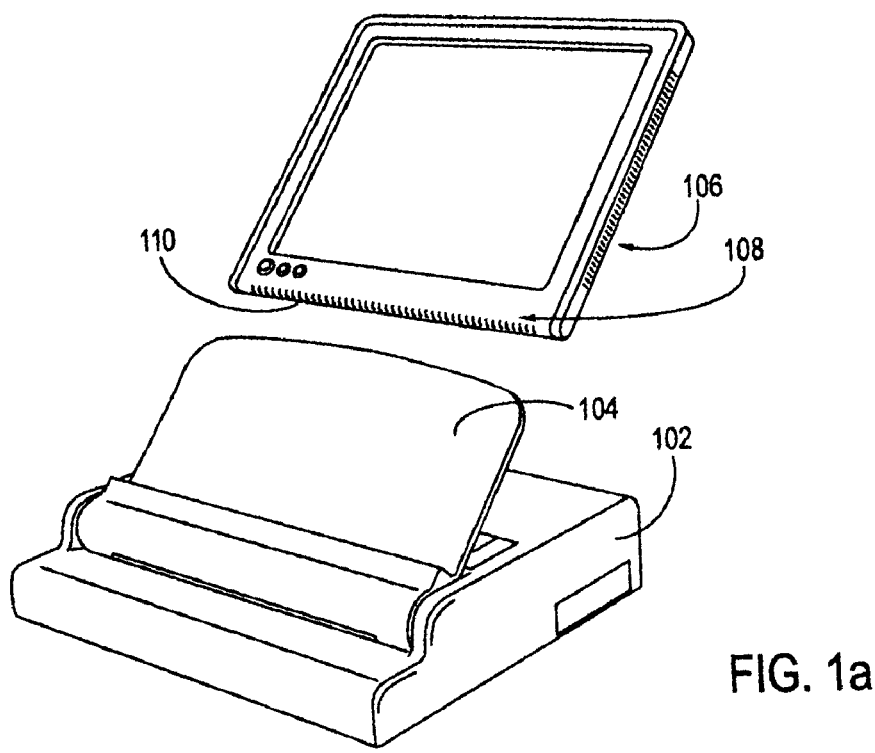
FIGS. 1a–b illustrate a docking station in accordance with one embodiment.

Illustrated in FIG. 1a is an illustration of a docking station 102, according to one embodiment, and a tablet computer 106 undocked. As illustrated, the docking station 102 includes a tablet cradle 104. The tablet cradle 104 is to receive the tablet computer 106. In one embodiment, the tablet includes vents 108 at a bottom side 110 that would rest parallel to the cradle 104. The vents 108 provide for a passageway for air movement with an internal chamber of the docking station. In alternative embodiments, the vents of the portable computer may be provided in alternative locations.

In one embodiment, the tablet computer is a portable computer that includes a touch screen. Tablet computers can be specialized for Internet use or can include additional conventional general-purpose personal computer component and features. The tablet computers may also be referred to as Webpads or Tablet PCs.

Figure 1B:
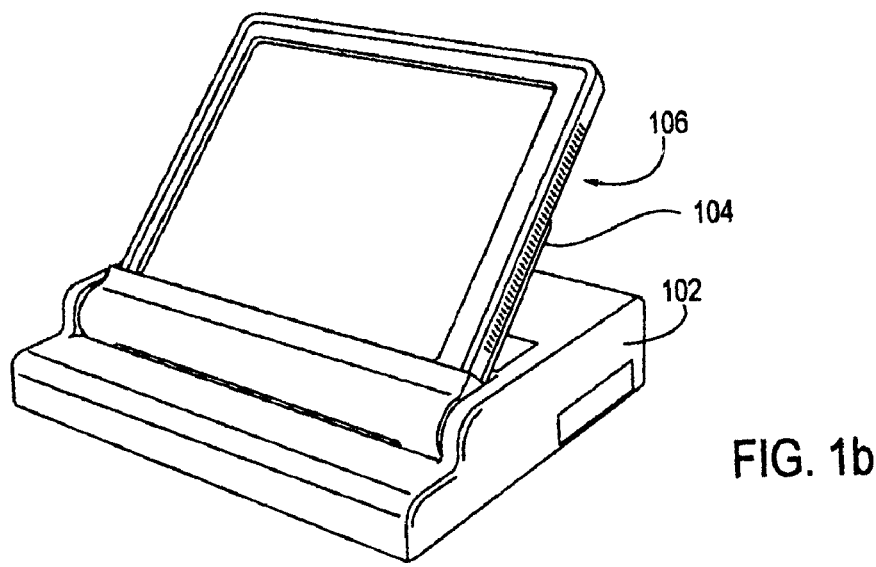

FIG. 1b illustrates the tablet 106 docked in the cradle 104 of the docking station 102. The cradle 104 supports the tablet in a substantially vertical upright position to be viewed by a user. In one embodiment, the cradle is rotatably mounted to the docking station 102 to provide multiple different viewing positions of the tablet.

In addition to providing an upright support for the tablet computer, in one embodiment the cradle and docking station extend the functionality of the tablet computer to include additional features comparable to a desktop system. For example, in one embodiment, the cradle provides plugs and sockets to connect and provide the tablet computer with power from an AC outlet, cable lines for a separate monitor, a printer, networking connections, a keyboard, a mouse, speakers and/or other peripherals such as a CD-ROM or disk drive.

In addition, the cradle and the docking station may extend the thermal cooling of the tablet computer. As a result, a processor of the tablet computer is able to run at a higher frequency than when in undocked battery mode. A faster processor generates more heat and typically requires more cooling, which can be satisfied by the extended thermal capabilities of the docking station.

Figure 2:
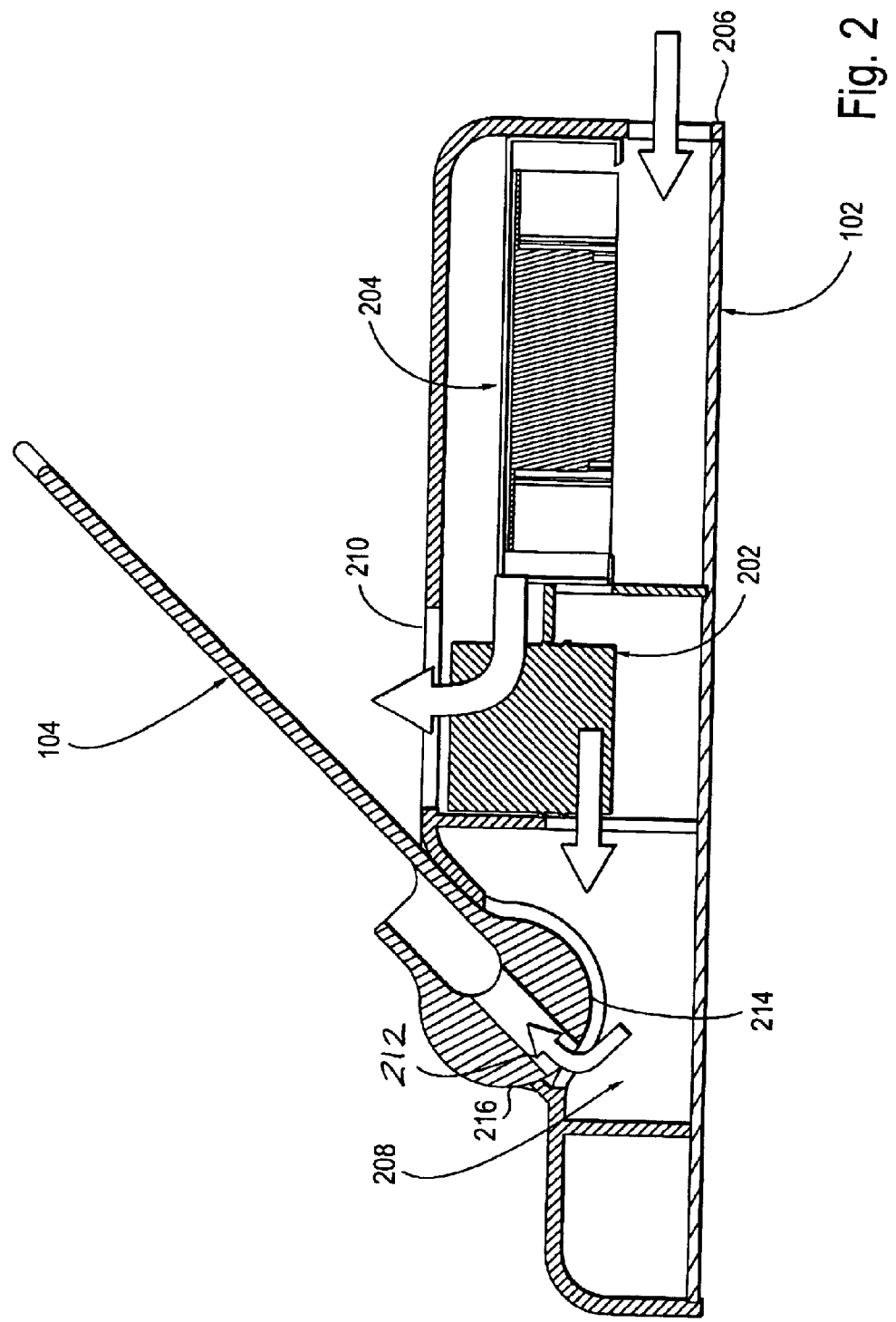
FIG. 2 illustrates a cutaway view of a docking station in accordance with one embodiment.

FIG. 2 illustrates a cut away perspective of the docking station 102 and cradle 104, according to one embodiment. In one embodiment, the docking station 102 includes a cooling unit 202. The cooling unit 202 may include one of a group comprising of a thermoelectric cooling unit, a compressor unit, a magnetic refrigeration unit, or an thermoacoustic refrigeration unit.

In one embodiment, the docking station 102 further includes a unit 204 to create air movement for the cooling unit, (e.g., a fan unit). In the case of a fan unit 204, external air is brought into the docking station 102 via the fan unit 204 through an air inlet 206 of the docking station. The fan unit 204 feeds the cooling unit with the external air. In one embodiment, the cooling unit 202 feeds cooled air into a pressure reservoir 208 (the cooled air being cooler in temperature than air external to the docking station). Hot air exhaust may be released via an exhaust outlet 210 of the docking station 102. In one embodiment, the docking station 102 only includes a unit 204 to move air to provide thermal cooling to the tablet computer, and does not include a cooling unit.

In one embodiment, the rotating cradle 104 includes a passageway 212 to the pressure reservoir 208. As a result, the cooled air in the reservoir 208 is able to pass through the cradle 104 and into the vents 108 of the tablet computer 106 to provide the extended thermal cooling of the tablet computer 106.

In one embodiment, the pressure reservoir 208 includes a socket aperture 214 to receive the cradle 104. A ball ending 216 of the cradle 104 sits in the socket 214. The ball 216 of the cradle traps the cooled air in the reservoir 208 and allows the cool air only to be released from the reservoir 208 via the passageway 212 of the cradle 104. Therefore, the cradle 104 and ball 216 of the cradle can be rotated within the socket 214 while continuing to confine the cooled air of the reservoir 208 and allow air to only be released via the passageway 212.

These embodiments have been described with reference to specific exemplary embodiments thereof. It will, however, be evident to persons having the benefit of this disclosure that various modifications and changes may be made to these embodiments without departing from the broader spirit and scope of the embodiments described herein. The specification and drawings are, accordingly, to be regarded in an illustrative rather than a restrictive sense.

What is claimed is:

1. An apparatus comprising:
    a housing;
    a cooling unit within the housing;
    a tablet cradle to receive and support a tablet computer, the cradle including a passageway to receive air from the cooling unit and to provide the air to a vent of the tablet computer, the tablet cradle is pivotally attached to the housing; and
    a pressure reservoir to receive air from the cooling unit and to release the air to a passageway of the cradle.

2. The apparatus of claim 1 wherein the cooling unit is one of a group comprising of a thermal electric unit, a compressor unit, a magnetic unit, and an acoustic unit.

3. The apparatus of claim 1 wherein the cooling unit includes a fan positioned in the housing to direct cooled air to a bottom of the tablet cradle and air exhaust out to an exit vent the housing.

4. A method comprising:
    a tablet cradle of a docking station receiving and supporting a tablet computer;
    a cooling unit of the docking station providing cooled air to the tablet computer via a passageway of the tablet cradle; and
    providing multiple viewing positions of the tablet computer via rotating the table cradle; a pressure reservoir receiving air from the cooling unit and releasing the air to a passageway of the cradle.

5. The method of claim 4 wherein the cooling unit is one of a group comprising of a thermal electric unit, a compressor unit, a magnetic unit, and an acoustic unit.

6. The method of claim 4 wherein the cooling unit includes a fan positioned in the docking station to direct cooled air to a bottom of the tablet cradle and air exhaust to an exit vent of the housing.

7. An tablet computer docking station comprising:
    a cooling unit;
    a tablet cradle to receive and support the tablet computer, the cradle including a passageway to receive air from the cooling unit and to provide the air to a vent of the tablet computer, the tablet cradle is pivotally attached to the housing; and
    a pressure reservoir to receive air from the cooling unit and to release the air to a passageway of the cradle.

8. The docking station of claim 7 wherein the cooling unit is one of a group comprising of a thermal electric unit, a compressor unit, a magnetic unit, and an acoustic unit.

9. The docking station of claim 7 wherein the cooling unit includes a fan positioned to direct cooled air to a bottom of the tablet cradle and air exhaust to an exit vent of the docking station.

10. An apparatus comprising:
    a housing;
    a tablet cradle to receive and support a tablet computer, the cradle including a passageway to receive air from a fan and to provide the air to a vent of the tablet computer, the tablet cradle is pivotally attached to the housing; and
    a pressure reservoir to receive air from the cooling unit and to release the air to a passageway of the cradle.

* * * * *